July 20, 1943.   W. H. RUPP ET AL   2,324,955
PROCESS FOR REMOVING WATER FROM HYDROCARBON VAPORS
Filed March 22, 1941
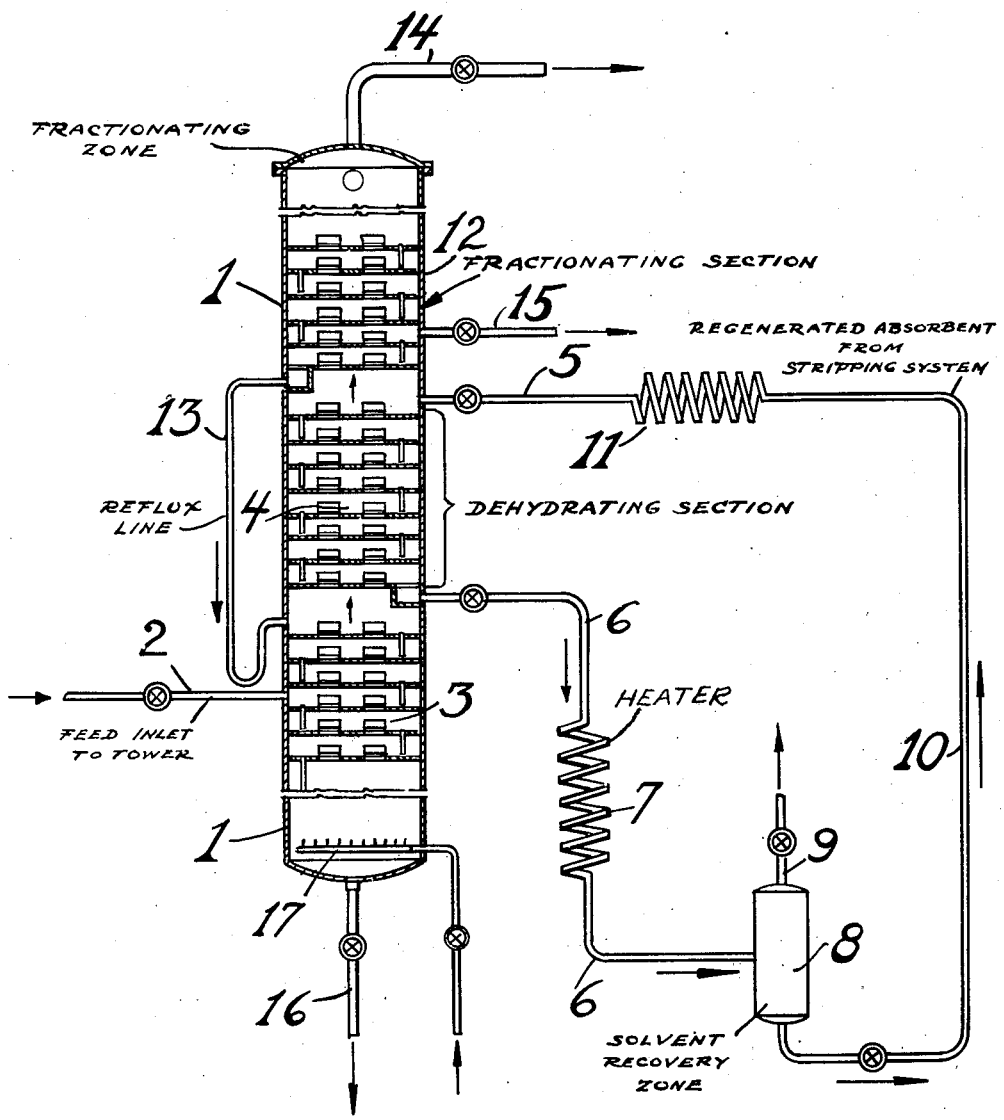
Walter H. Rupp
Milton Ritchie Smith  Inventors
By P. L. Young  Attorney Patented July 20, 1943

2,324,955

UNITED STATES PATENT OFFICE 2,324,955

PROCESS FOR REMOVING WATER FROM HYDROCARBON VAPORS

Walter H. Rupp, Mountainside, and Milton Ritchie Smith, Westfield, N. J., assignors to Standard Oil Development Company, a corporation of Delaware Application March 22, 1941, Serial No. 384,766

1 Claim. (Cl. 196—85)

The present invention is concerned with the refining of mineral oils. The invention is more particularly concerned with an improved distillation or fractionation operation in which objectionable aqueous constituents are efficiently and substantially completely removed from upflowing oil vapors. In accordance with the present process, upflowing oil vapors comprising aqueous constituents are countercurrently extracted through a portion of the distillation zone with a downflowing selective solvent having a preferential selectivity for the aqueous constituents.

It is known in the art to refine and fractionate oils, particularly petroleum oils, utilizing various distillation and fractionation operations. In many of these operations, the upflowing oil vapors contain aqueous constituents which are undesirable and hinder efficient separation of the respective oil constituents. The aqueous constituents present in the upflowing oil vapors may be derived from water present in the feed oil or may be derived from stripping steam and the like employed in the operation. These aqueous constituents may be entrained as liquid particles, but are more generally present in the form of water vapor. Also in many operations the temperature and pressure conditions existing at the bottom of the distillation zone may be such that an appreciable quantity of water vapor is present in the upflowing gases and will be removed from the top of the distillation zone along with the oil vapors. However, in other operations of this character, a differential exists with respect to the operating temperatures at the bottom and at the top of the distillation zone, which results in an appreciable amount of the water vapors being condensed. When this condition exists, if an efficient separation is to be made between the respective oil constituents, it is necessary to remove the condensed water.

Various means have been employed for accomplishing this result, which means generally comprise various water drawoff means from the individual fractionating plates or trays. When operating in this manner, condensed water is withdrawn at suitable points which will permit a satisfactory operation. However, even under these conditions an appreciable amount of water vapor is present in the upflowing oil constituents, the concentration of which will be a function of the partial pressure of the water. In accordance with our invention, the water constituents are substantially completely removed in an efficient and economical manner which will permit and result in a more efficient distillation operation and which will also permit a better segregation of the respective oil constituents. In accordance with our process, the water vapor is removed from upflowing oil constituents in a distillation zone by countercurrently extracting the upflowing mixture with a downflowing selective solvent having a preferential selectivity for the water constituents throughout a portion of the upflowing path.

Our invention may be readily understood by reference to the drawing illustrating an embodiment of the same. For the purpose of illustration, it is assumed that the feed to the fractionating zone comprises a vaporous mixture of oil constituents and water vapor. The feed mixture is introduced into an intermediate section of fractionating zone 1 by means of feed line 2. The vaporous mixture flows upwardly through fractionating section 3 and enters dehydrating section 4. In dehydrating section 4 the upflowing vapors comprising water vapor are countercurrently extracted with a downflowing solvent which has a preferential selectivity for the water vapor and which is introduced at the top of dehydrating section 4 by means of line 5.

The selective solvent containing dissolved therein the water vapor is withdrawn from the bottom of dehydrating section 4 by means of line 6, heated in heater 7, and introduced into solvent recovery zone 8. Temperature and pressure conditions are adjusted in zone 8 substantially completely to free the selective solvent of the water vapors which are removed overhead by means of line 9 and disposed of as desired. The solvent, free of aqueous constituents, is removed from zone 8 by means of line 10 and recycled to the top of the dehydrating section. The temperature of the solvent introduced at the top of the dehydrating section is adjusted to the desired degree by means of cooling means 11. Vapors freed to the desired extent of water vapors flow upwardly from the dehydrating section into the upper fractionating section 12 of the fractionating zone 1 and are handled in a manner to secure the desired quality of the overhead products. Relatively low boiling hydrocarbon constituents are removed overhead from fractionating zone 1 by means of line 14 and handled as desired. Intermediate boiling constituents are removed from fractionating zone 1 by means of line 15, while relatively high boiling constituents are removed as a bottoms by means of line 16. The desired removal of the relatively low boiling constituents and intermediate boiling constituents from the relatively high boiling constituents is secured by means of open steam which is introduced into fractionating zone 1 by means of line 17. In order to attain equilibrium conditions throughout the fractionating zone, reflux is passed from the bottom of fractionating section 12 to the top of fractionating section 3 by means of line 13.

The process of the present invention may be widely varied. It is to be understood that the respective zones may comprise any number and arrangement of units. The invention essentially comprises removing aqueous constituents from upflowing oil vapors in a distillation or fractionating zone by countercurrently extracting the upflowing vapors throughout a portion of the distillation or fractioning zone with a countercurrently flowing solvent having a preferential selectivity for the aqueous constituents.

The solvent may be any suitable substance having a relatively low vapor pressure and one which will not be vaporized to any extent under the conditions existing in the fractionating zone. For example, when dehydrating a stock which has an end point of about 200° F., it is preferred that the solvent boil in the range above about 225° F. and have a vapor pressure below about 50 mm. at a temperature of about 100° F. In general, it is preferred that the dehydrating solvent boil at least 25° and preferably 50° above the end point of the stock being dehydrated. Suitable solvents are, for example, diethylene glycol, various calcium chloride solutions, lithium chloride solutions, zinc chloride solutions, and sulfuric acids.

It is preferred that the solvent be introduced at the top of the dehydrating section at a temperature equivalent to the temperature existing within the fractionating zone at the particular point of introduction.

Although the operation is particularly adapted for the removal of aqueous constituents from upflowing vapors, it is to be understood that the process may be adapted to the removal of other constituents such as carbon dioxide and hydrogen sulfide. In operations of this character, other solvents are employed such as diethanolamine, monoethanolamine, triethanolamine, potassium phosphate solutions, and the like.

By removing the water vapor in accordance with the present process at a point in the fractionating tower, advantage may be taken of the fact that most of the water will condense in the lower section of the tower and may be removed as a liquid by suitable drawoff means. Thus, in the dehydrating section it is necessary to remove only the water which is not condensed in and withdrawn from the lower section of the tower. Furthermore, toward the top of the fractionating tower under certain operations the temperature is below that at which gas hydrates will condense from a mixture of oil constituents and water vapor. These hydrates are corrosive and it is desirable that they not be allowed to form. For this reason, it is preferred to locate the dehydrating section at a point in the tower at which the temperature is higher than that at which gas hydrates will form under the operating conditions. In general, the dehydrating section is located in the tower at a point as high as possible without encountering temperatures low enough to permit gas hydrates to form.

What we claim as new and desire to protect by Letters Patent is:

Improved process for the segregation of a petroleum feed oil into relatively low boiling constituents and into relatively high boiling constituents, which comprises distilling said feed oil in a distillation zone comprising an upper fractionating section, an intermediate dehydrating section, and a lower fractionating section, said feed oil being introduced into said lower fractionating section, maintaining temperature and pressure conditions in said distillation zone and introducing steam into said lower fractionating section to vaporize said lower boiling hydrocarbon constituents, whereby said lower boiling hydrocarbon constituents flow upwardly through said dehydrating section into said upper fractionating section, countercurrently extracting said relatively low boiling hydrocarbon constituents in said dehydrating section with a selective solvent for aqueous constituents, which solvent is introduced at a point intermediate said upper fractionating section and said intermediate dehydrating section, and is withdrawn from a point intermediate said dehydrating section and said lower fractionating section, by-passing liquid flowing down from said upper fractionating section around said dehydrating section into the upper part of said lower fractionating section, and removing relatively low boiling hydrocarbon constituents overhead from said distillation zone and relatively high boiling hydrocarbon constituents as a bottoms from said distillation zone.

WALTER H. RUPP.
MILTON RITCHIE SMITH.